United States Patent [19]
Kiesling

[11] Patent Number: 5,862,718
[45] Date of Patent: Jan. 26, 1999

[54] INDEXING TABLE

[76] Inventor: Jeff L. Kiesling, P.O. Box 81, Roseville, Mich. 48066-0081

[21] Appl. No.: 813,458

[22] Filed: Mar. 10, 1997

Related U.S. Application Data

[63] Continuation of Ser. No. 425,618, Apr. 20, 1995, abandoned.
[51] Int. Cl.$^6$ ...................................................... B23B 29/24
[52] U.S. Cl. ........................ 74/813 R; 74/813 L; 269/20; 414/676
[58] Field of Search .............................. 74/813 R–813 L; 269/20; 29/559; 414/676

[56] References Cited

U.S. PATENT DOCUMENTS

| | | | |
|---|---|---|---|
| 3,772,961 | 11/1973 | Siebert | 74/813 R X |
| 4,058,885 | 11/1977 | Bergman | 29/559 |
| 4,143,868 | 3/1979 | Bergman | 269/20 |
| 4,179,106 | 12/1979 | Bergman | 269/20 |
| 4,256,312 | 3/1981 | Ikeda | 369/269 |
| 4,275,983 | 6/1981 | Bergman | 269/20 |
| 4,333,363 | 6/1982 | Inaba et al. | 74/826 |
| 4,721,017 | 1/1988 | Jorgensen et al. | 74/813 L |
| 5,239,892 | 8/1993 | Sakai | 74/813 L |

Primary Examiner—Vinh T. Luong
Attorney, Agent, or Firm—Weintraub & Brady

[57] ABSTRACT

An indexing table having a mounting plate, a support plate and a base. The indexing table further has a lifting piston, locating pistons and clamps for clamping the support plate. The indexing table additionally provides a valve to carry out the specific operations.

16 Claims, 4 Drawing Sheets

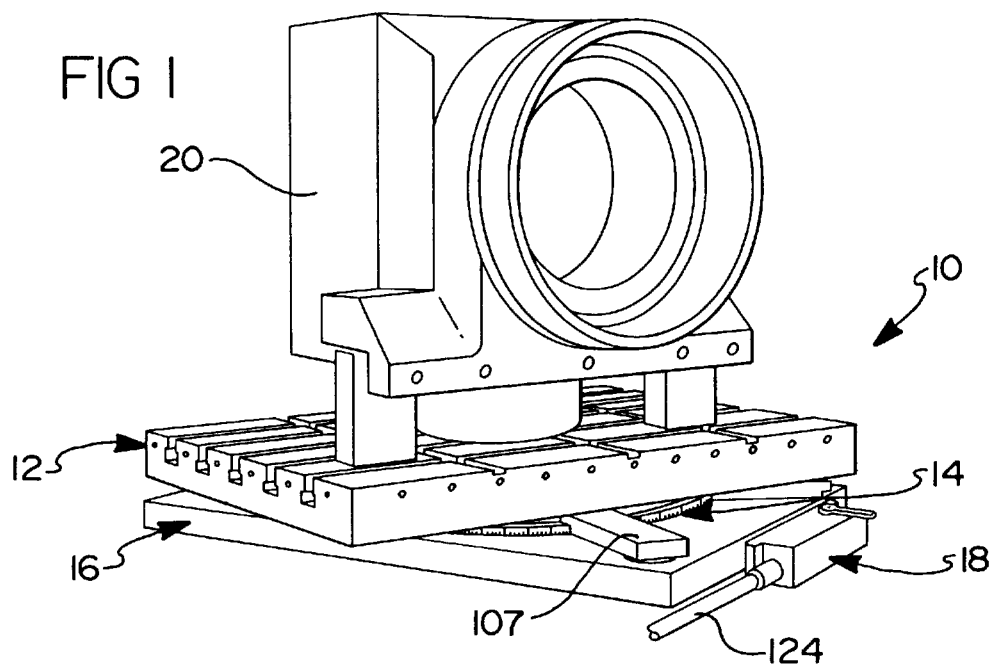
FIG 1
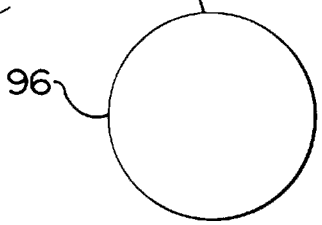
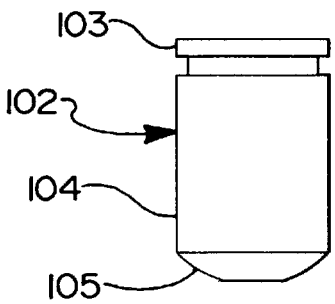
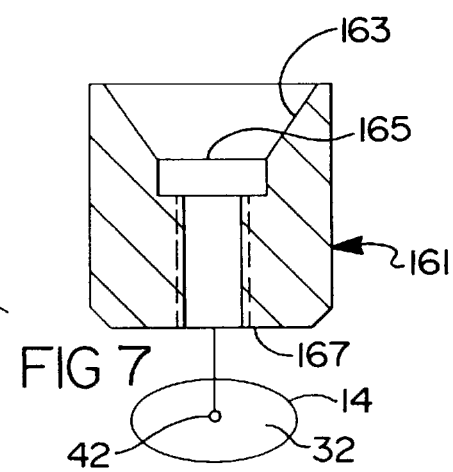
FIG 7
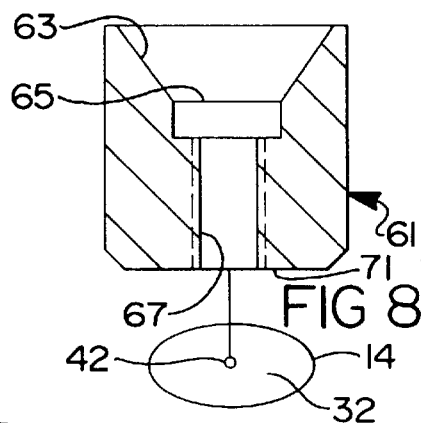
FIG 8
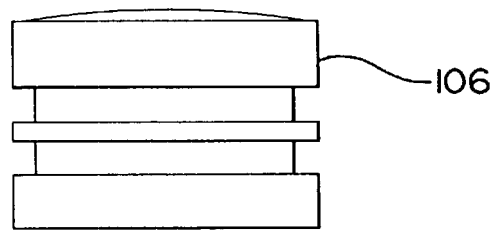
FIG 9

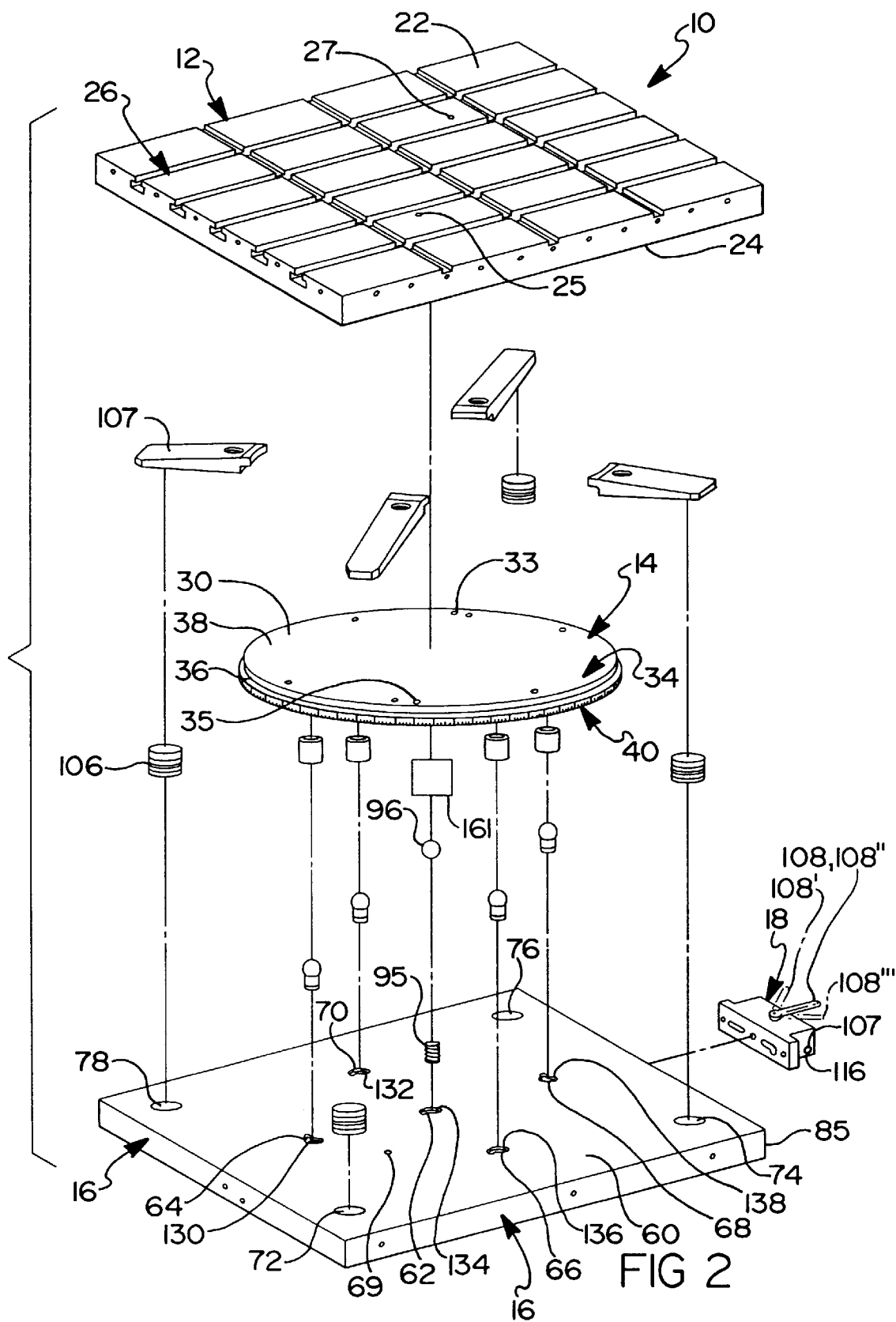

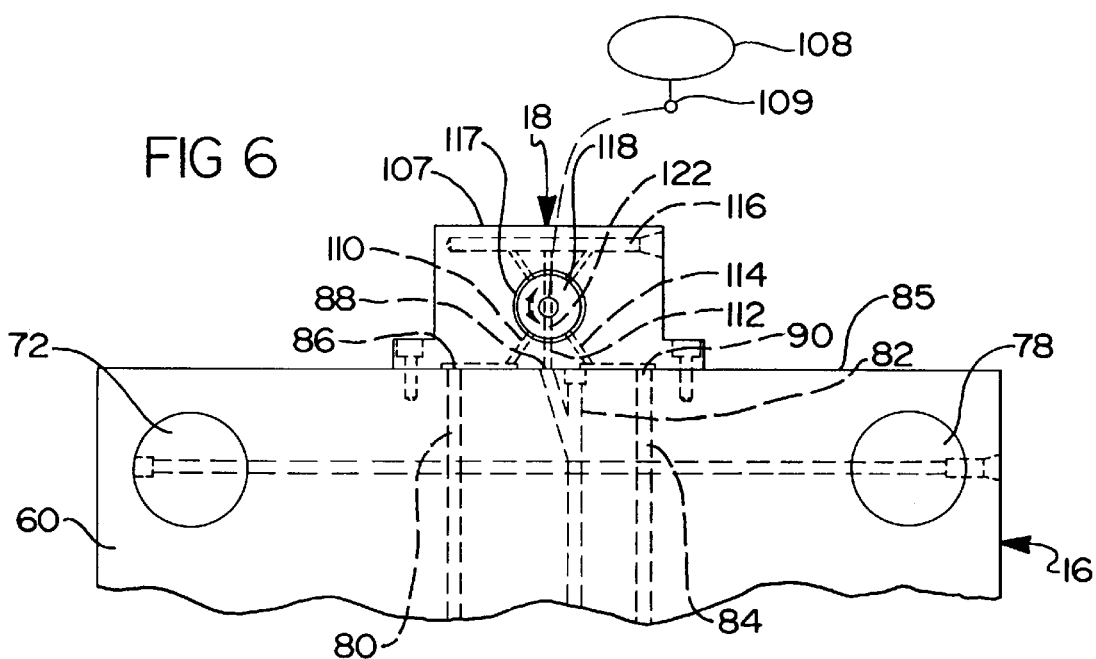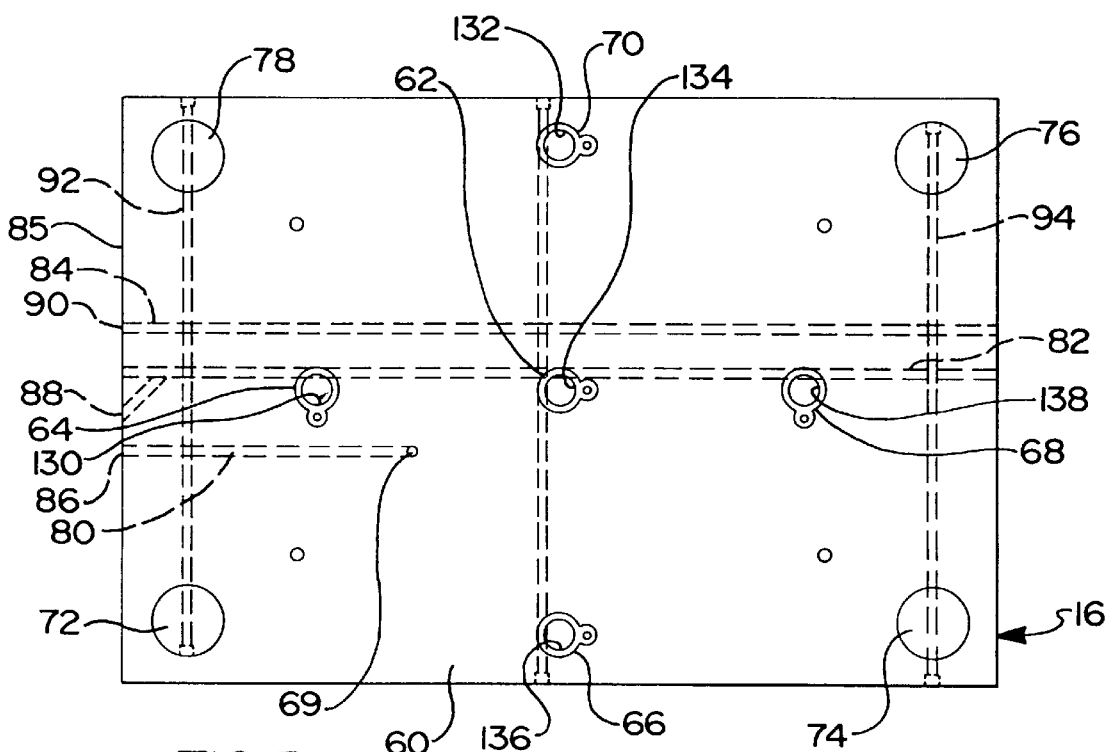

INDEXING TABLE

This is a continuation of application Ser. No. 08/425,618, filed Apr. 20, 1995, abandoned.

BACKGROUND OF THE INVENTION

1. Field of the Invention

The present invention relates to indexing tables. More particularly, the present invention relates to an indexing table which includes an air-driven clamping mechanism. Even more particularly the present invention discloses an indexing table which includes sequentially configured means for lifting a tabletop, rotationally locating the tabletop, and locking the tabletop in a fixed position.

2. Prior Art

The need for a highly durable indexing table is well illustrated by the common requirement in machine shops of supporting a work-piece at a predetermined angle for performing operations thereupon.

Indexing tables are tables that may be rotated about an axis. In this way, a work-piece, such as an engine block, which is to be machined, may be precisely rotated to accurately position the piece. The use of an indexing table simplifies the process in that the work-piece does not have to be lifted off the table top, rotated, and set back down, especially as some pieces tend to weigh hundreds and even thousands of pounds. Additionally, indexing tables provide an extremely accurate and precise means for rotating and positioning a work-piece to be machined.

Currently produced indexing tables provide a work-piece mounting plate which includes an x-y grid pattern of threaded holes and precision bores. A work-piece is generally set atop the mounting plate and secured thereto via clamps, or the like. The mounting plate is then rotated until the desired rotational position of the piece is achieved.

To facilitate its rotation, the mounting plate is generally lifted by a cushion of air provided by an air compressor. The mounting plate is attached to a base via a pivot pin, or a mounting pin. The air pressure is generally supplied through the base consequently pushing the mounting plate upward. In this configuration, the mounting plate may be rotated about the axis of the pivot pin. It is to be appreciated that many times this pivot pin is damaged or broken because a work-piece on the mounting plate falls over while the mounting plate is being rotated. When this occurs, the indexing table must be disassembled and repaired.

Once the mounting plate appears to be in the appropriate rotational location, an operator then engages the locating mechanism of the indexing table. Currently produced indexing tables include a locating mechanism which is essentially a pivot pin or dowel that slides into an aperture at the bottom of the mounting plate. Because only one pivot pin is used to locate the mounting plate, the accuracy and precision of the locating mechanism is quite limited. A source of pneumatic pressure, such as a compressor, is used to push the pivot pin into the aperture where it is held. Additionally, it is to be appreciated that currently produced indexing tables use the pivot pin or dowel to locate the mounting plate only at 90° intervals. Positioning the mounting plate at other angular intervals currently requires manual location of the mounting plate.

Once the mounting plate has been located, it is then locked into place by the use of a manually operated clamp. Occasionally, an operator will forget to lock the mounting plate into place by tightening the clamp. If this occurs, both the locating pin and the mounting pin may be bent or broken. If the mounting plate is rotated, the locating pin will be bent or broken. If the mounting plate is moved laterally, both the mounting pin and the locating pin will be bent. It is well known in the art that these pins are often bent while a work-piece is being machined upon the mounting plate, rendering the indexing table useless until the pin(s) have been replaced. This can be a time consuming as well as expensive task that requires disassembling the table and repairing it.

Even if the mounting plate is locked down manually, as is the case with currently produced indexing tables, the risk still exists that the support plate may be moved if a work-piece it is supporting falls over, etc. Once again, both the mounting pin and the locating pin may be damaged or destroyed.

Additionally, it is to be appreciated that currently produced indexing tables include several handles, wherein each handle is used for a different purpose. Essentially, one handle is provided to activate the means for lifting the mounting plate and one handle is provided to activate the means for locating the mounting plate at one of the four 90° angle positions. A separate handle is used to manually clamp the mounting plate down to reduce the chance that the mounting plate will be accidentally moved due to any machining or slippage of a work-piece.

Because several different handles are utilized in the operation of currently produced indexing tables, it is well known in the art that operators, from time to time, tend to push the wrong handle. Therefore, if the handle to lift the table top is activated and the table is also locked down, damage can occur to the table itself.

Thus, it is to be appreciated that what is needed is an indexing table that is simpler and safer to operate. Additionally, what is needed is an indexing table that will not break if the table top is shifted because of some machining process taking place thereupon.

It is to the solution of the above presented problems to which the present invention is directed.

SUMMARY OF THE INVENTION

In accordance with the present invention, there is provided an indexing table comprising:

a mounting plate;

a support plate connected to the mounting plate;

means for rotatively suspending the support plate;

means for locating the support plate at a specific rotational position;

means for locking the support plate at a specific rotational position;

a base configured to house the means for rotatively suspending the support plate; and means for mutually exclusively activating the means for suspending the support plate, the means for locating the support plate at a specific rotational position, and the means for locking the support plate at a specific rotational position.

Generally, the indexing table includes a mounting plate having a top surface and a bottom surface. The mounting plate may be formed from a durable material such as steel, hard plastic or the like, and may be formed as a disk or other three dimensional configuration having a planar surface. The mounting plate is used to firmly hold work-pieces which are to be machined, such as engines, wheels or any other part that may require machining.

A support plate is mounted to the bottom surface of the mounting plate. The support plate may likewise be formed from a durable material such as steel, hard plastic, or the like. The support plate, which is mounted to the bottom of the mounting plate, rests upon a base.

The base may be formed from some strong metal or plastic and houses means for rotatively suspending the support plate. Essentially, the base directs a substantial amount of air pressure to the underside of the support plate which in turn lifts the support plate off of the base. The base houses an upwardly biased sphere which maintains the axial position of the support plate and allows it to rotate thereupon. Additionally the base may house means for locating the support plate at a specific rotational location. A set of pistons may be disposed in the base at substantially 90° angles to one another to precisely locate the support plate at a position chosen by a user. The base may also house the means for locking the support plate in a fixed position. This may be accomplished through the use of air driven clamps distributed about the base. The clamps fit over the support plate, clamping it to the base when air pressure is supplied to the clamps.

The present invention will be more clearly understood with reference to the accompanying drawings and the following detailed description, in which like reference numerals refer to like parts and where:

BRIEF DESCRIPTION OF THE DRAWINGS

FIG. 1 is a perspective environmental view of a preferred embodiment of the present invention in use.

FIG. 2 is a perspective exploded view of the preferred embodiment in accordance with the present invention;

FIG. 5 is a top plan view of the base of the preferred embodiment herein;

FIG. 6 is a top plan view of the control valve attached to the base of the preferred embodiment herein;

FIG. 7 is a side plan view of the lifting sphere and bushing of the preferred embodiment herein rotated 180 degrees from;

FIG. 8 is a cross-sectional view of the locating piston and a bushing of the preferred embodiment herein rotated 180 degrees from;

FIG. 9 is a perspective view of the clamping piston of the preferred embodiment herein.

DETAILED DESCRIPTION OF THE PREFERRED EMBODIMENT

Figure 4:
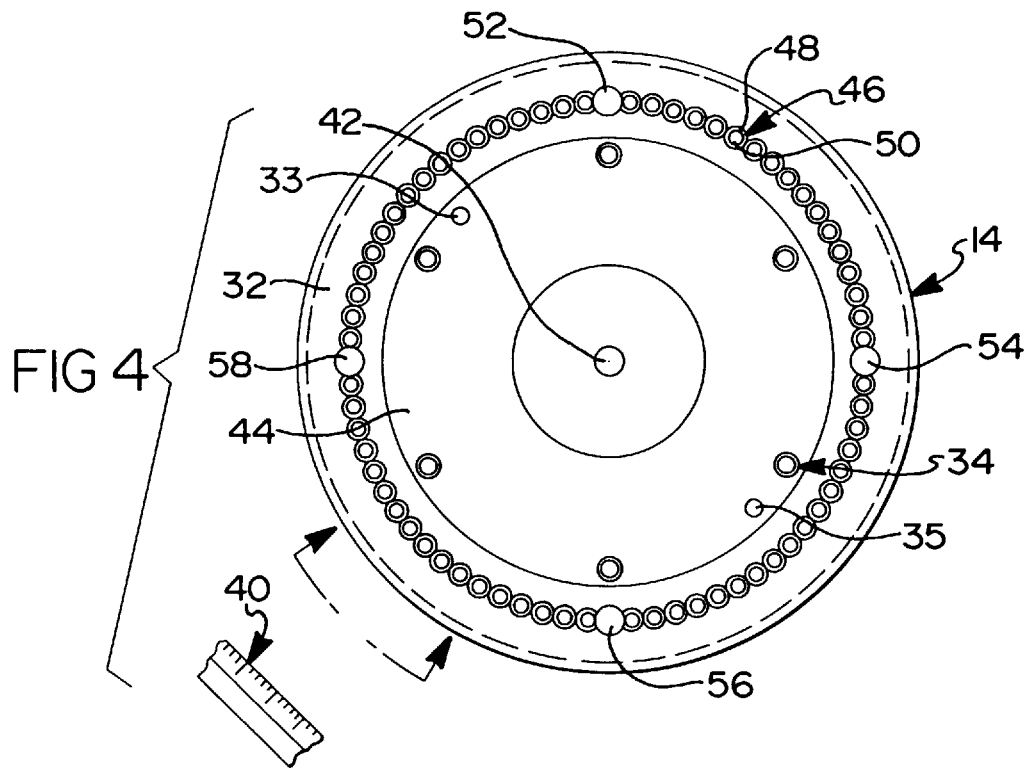
FIG. 4 is a bottom plan view of the support plate of the preferred embodiment herein.

Referring now to FIGS. 1 and 2, there is depicted a preferred embodiment of an indexing table 10 in accordance with the present invention. The indexing table 10 includes a mounting plate 12, a support plate 14, a base 16 and a control valve 18. The table 10 functions to provide precise rotational positioning of a work-piece 20, such as an engine block or the like. It is to be noted that the type of work-piece will vary and as such, the mounting plate 12 is configured to support a variety of work-pieces.

The mounting plate 12 is preferably rectangularly shaped; however, other configurations are appropriate as well. The mounting plate 12 is formed from a strong durable material, such as steel, strong plastic, or the like. The mounting plate 12 has a top surface 22 and a bottom surface 24. A plurality of C-channeled grooves 26 are cut or bored into the top surface 22. The grooves 26 cooperate with tie down clamps (not shown) for mounting a piece 20, such as an engine block. The tie-down clamps are inserted into and retained within the grooves 26. Such tie down clamps are well known in the art and as such are not further described herein.

Figure 3:
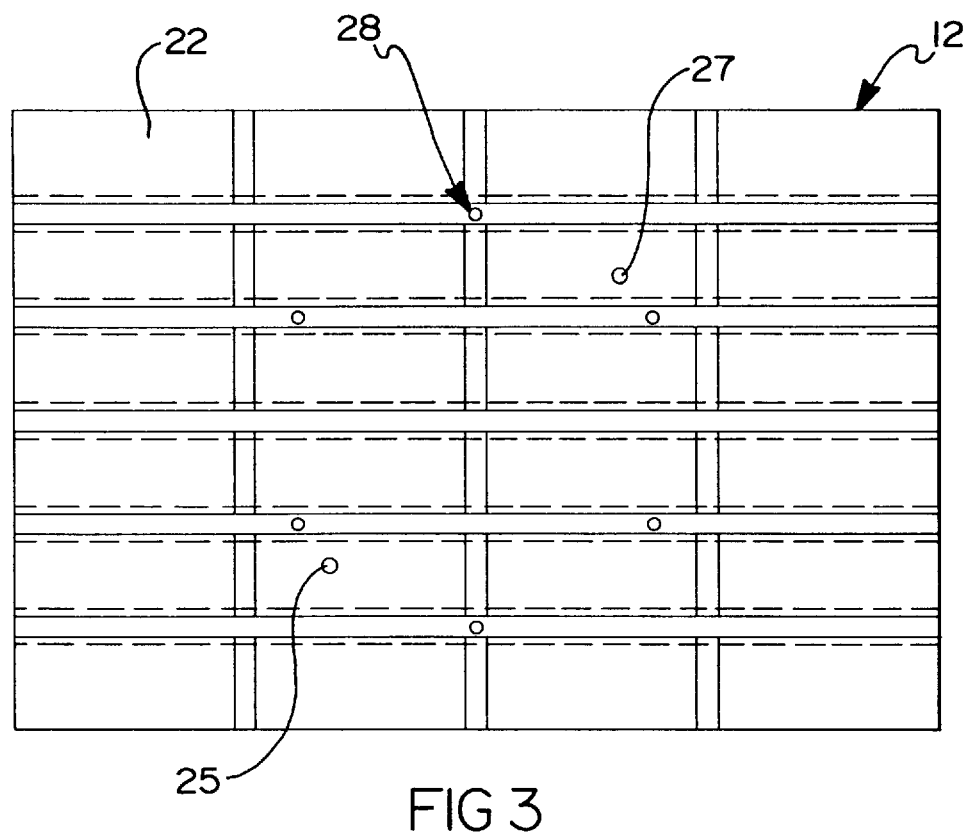
FIG. 3 is a top plan view of the mounting plate of the preferred embodiment herein.

As shown in FIGS. 2 and 3, the mounting plate 12 has a plurality of bores 28 extending from its top surface 22, through the mounting plate 12 to its bottom surface 24. Each bore 28 is, preferably, threaded and may be formed by drilling through the mounting plate 12 with a drill press or the like. Such machining is well known in the art and as such will not be further discussed herein.

Additionally, two dowel holes 25, 27 extend from the top surface 22 to the bottom surface 24 of the mounting plate 12. Each of the plurality of bores 28 and dowel holes 25, 27 receives a screw, dowel, bolt, or the like to attach the mounting plate 12 to the support plate 14. Such attachment will be described herein below.

The support plate 14 of the preferred embodiment of the indexing table 10 is best shown in FIGS. 2 and 4. The support plate 14 is preferably formed from a strong material, such as plastic, steel, or some other well known hard, durable material. The support plate 14 has a top surface 30 and a bottom surface 32 as well as a plurality of threaded bores 34 extending between its top surface 30 and its bottom surface 32. Additionally, the support plate 14 includes two dowel holes 33, 35 which extend from its top surface 30 to the bottom surface 32. Dowels (not shown) are first placed into the dowel holes 25, 27 in the mounting plate 12 while the mounting plate rests atop the support plate 14. The bottom surface 24 of the mounting plate 12 contacts the top surface 30 of the support plate 14. The mounting plate 12 and the support plate 14 are aligned so that holes 25, 33 and 27, 35 are in registry. Dowel pins are extended through both sets of holes 25, 33, and 27, 35. The dowel pins assure the proper alignment of the mounting plate 12 and the support plate 14. The support plate 14 is mounted to the mounting plate 12 at the mounting plate's bottom surface 24 via a plurality of screws, rivets or the like, each of which extend through one of the plurality of bores 28 in the mounting plate 12 and a corresponding one of the bores 34 in the support plate 14.

As can be seen in FIGS. 2 and 4, the top surface 30 of the support plate 14 is formed as a circular central disk 38 having a rim 36 circumferentially extending thereabout. The rim 36 and the central disc 38 are preferably integrally formed, although they may be produced separately and then attached via welding, bonding or the like. The edge of the rim 36 includes a plurality of markings 40, wherein each mark indicates 1° of rotation. Therefore, there are 360 marks equally circumferentially spaced about the rim 36. The rim 36 is not as thick as the central disc 38, and therefore the central disc 38 extends upwardly a distance further than the rim 36. In this way, when the support plate 14 is mounted to the mounting plate 12, a user can see the plurality of markings 40 on the rim 36 of the support plate 14. Therefore, a user can accurately angularly position the mounting plate 12 by referring to the plurality of markings 40 at the edge of the rim 36 of the support plate 14. The process by which a user positions the table will be further described hereinbelow.

Referring now to FIGS. 4 and 7, the bottom surface 32 of the support plate 14 includes a first centrally located recess 42 formed therein which receives a hardened bushing. A preferred hardened bushing 161 includes an inwardly tapered sidewall 163, an end wall 165 and a bore drilled therethrough, or formed therein. The bushing 161 is slidably received in the first recess 42 where it is screwed, riveted, welded, or held in place by using a glue or other bonding material. The bushing 161 is formed preferably from a hardened metal, such as steel, but may also be another highly durable, strong material. The bushing 161 slidably receives a lifting sphere 100, the function of which is further described hereinbelow. The bottom surface 32 of the support plate 14 additionally includes a second recess 44, which is shallow. The second recess 44 is coaxial with and radially surrounds the first recess 42, and has a radius less than the distance from the center of the central disc 38 to the rim 36. The second recess 44 provides space for air to lift the support plate 14 and the mounting plate 12 off of the base 16. This process will be further described hereinbelow.

A plurality of substantially identical, evenly spaced indents 46 radially extend proximate the outer edge of the bottom surface 32, radially outside of the second recess 44. Each of the plurality of indents 46 includes an inwardly tapering side wall 48 and an inner wall 50. Therefore, each of the plurality of indents 46 is conical in shape. Each of the indents 46 is spaced about five degrees of rotation from each indent on either side thereof, therefore, there are seventy-two indents equally spaced and radially surrounding the second recess 44 at the bottom surface 32 of the support plate.

Four of the plurality of indents 46, radially spaced at 90° intervals, are further hollowed out to form four bushing recesses 52, 54, 56, 58. The bushing recesses 52, 54, 56, 58 are each provided to slidably receive a hardened steel bushing 61 such as that depicted in FIG. 8. A hardened steel bushing 61 is slidably received in each of the recesses 52, 54, 56, 58, and has a side wall 63 and end wall 65 both of which are substantially similar to the side wall and end wall of each of the plurality of indents 46. Additionally, each bushing 61 includes a threaded bore 67 formed therethrough. A screw, rivet, bolt or similar mounting means fits through the bore 67 to attach the bushing to the support plate 14. Alternatively, the bushing 61 may be pressed into place and the bore 67 may be used with a tool to remove the bushing from the recess. Therefore, the bore 67 may be used for either purpose. An advantage is gained by using hardened steel for these four locations because machinists perform most machining work by rotating a piece at 90° intervals. By using a hardened bushing 61 at these locations, the indexing table 10 lasts longer and the precision of the table 10 is preserved. The bushings 61 and 161 may alternatively be formed from some other hard, durable material, such as hardened plastic or another metal.

Now referring to FIGS. 2, 5 and 6, there is depicted the base 16 of the indexing table 10 in accordance with the preferred embodiment. The base 16 includes a top surface 60, a centrally located rotate recess 62, a lift recess 69, four locate recess 64, 66, 68, 70, and four clamping recesses 72, 74, 76, 78. Each of the four locate recesses and each of the four clamping recesses 72, 74, 76, 78 are bored into the base at 90° intervals to each other. Each of the recesses formed in the base 16 extends from the top surface 60 down into the base 16. Alternatively, each of these recesses may be formed in the base 16 by casting the base 16 to include each of the recesses as well.

The recesses are configured such that when the bottom surface of the support plate 14 is set upon the top surface 60 of the base 16, the first recess 42 and the bushing 61 located therein at the bottom of the support plate 14 are coaxially aligned with the rotate recess 62 in the base 16, and the lift recess 69 is in communication with the second recess 44 in the bottom surface of the support plate 14. Also, depending upon the rotational position of the support plate, four of the plurality of indents 46 substantially formed at the bottom surface of the support plate 14, or each of the four hardened bushings, should be substantially coaxial and in communication with a corresponding locate recess 64, 66, 68, 70 when the support plate 14 is placed upon the base 16. Each of the four clamping recesses 72, 74, 76, 78 should be located beyond the circumference of the rim 36 of the support plate 14 when the support plate 14 is set upon the base 16 as described herein above.

Each of the locate recesses 64, 66, 68, 70 and the rotate recess 62 slidably receives a bushing 130, 132, 134, 136 and 138, such as that produced by the Colonial Bushings Company and commonly known in the art. Each of the bushings 130, 132, 134, 136 and 138 includes a keeper for securing the bushing in one of the recesses. As the bushings and keepers are well-known, they will not be further discussed herein.

The base 16 has several sets of pathways formed therein: a lift pathway 80, a locate pathway 82, and a clamp pathway 84. The pathways 80, 82, 84 and the recesses 130, 132, 134, 136, 138 in the base 16 are preferably formed in the base 16 by boring or drilling them into the base 16. However, it is to be appreciated that the pathways as well as the recesses formed in the base 16 may be created by casting the base 16 to include such elements. Each of the pathways 80, 82, and 84 begins at a side 85 of the base 16. As shown in FIG. 8, the lift pathway 80 begins at the side 85, at a location referred to as a lift terminator 86. The locate pathway 82 begins at the side 85 at a location referred to as the locate terminator 88. And the clamp pathway 84 begins at a location referred to as the clamp terminator 90. Each of the terminators 86, 88, 90 is essentially an aperture formed in the side of the base 16. The pathways 80, 82, 84 are essentially holes drilled into the base 16 having a circular cross-section. It is to be appreciated that the pathways 80, 82, 84 may have a variety of cross-sectional areas or configurations, such as square or rectangular etc. The pathways 80, 82, 84 direct pressurized air to specific recesses and the bushings contained therein to perform specific operations such as lifting, locating and clamping the support plate.

As depicted in FIG. 5, the lift pathway 80 extends between the lift terminator 86 and the lift recess 69 and provides fluid communication therebetween. It is to be appreciated that the lift pathway 80, the locate pathway 82 and the clamp pathway 84 do not intersect one another. They are drilled into or formed in the base 16 at different depths to ensure they are not in communication with each other.

The locate pathway 82 extends from the locate terminator 88 to the bottom of the first locate recess 64. The locate pathway then extends between the bottom of the first locate recess 64 and the bottom of the second locate recess 66. The locate pathway 82 further extends between the third and fourth locate recesses 68, 70 and intersects the portion of the pathway that connects the first and second locate recesses 64, 66. Therefore, all the locate recesses 64, 66, 68, 70 and the bushings 130, 132, 136 and 138 housed therein are in fluid communication with each other and the locate terminator 88 via the locate pathway 82.

The clamp pathway 84 includes a first portion 92 which extends between the bottom of the first clamping recess 72 and the bottom of the second clamping recess 74. The clamp pathway includes a second portion 94 which extends from the bottom of the third clamp recess 76 to the bottom of the fourth clamp recess 78. Finally, the clamp pathway 84 extends from the clamp terminator 90 and intersects both the first portion 92 and the second portion 94. Therefore the clamp pathway 84 provides fluid communication between each of the clamping recesses 72, 74, 76, 78 and the clamp terminator 90.

The rotate recess 62 is configured to receive a bushing 134. The bushing 134 is configured to receive a die spring 95 upon which rests the rotate sphere 96. The rotate sphere 96 is biased upward by the force of the die spring 95 which is aligned so as to push upwardly on the rotate sphere 96. The rotate sphere is configured to be received in the hardened steel bushing which is in place in the central recess 42 at the bottom surface 32 of the support plate 14.

Each of the four bushings 130, 132, 136 and 138 housed in the locate recesses 64, 66, 68, 70 are configured to receive a locate piston 102, such as that depicted in FIG. 8. The locate piston 102 has a well known piston body 103 with a cylindrical body portion 104 and a radially tapered head 105. The head 105 is integrally formed with the piston body 104. Piston rings are used to create seals for all of the pistons used in the indexing table. The tapered head 105 of each of the locate pistons will fit into one corresponding indent of the plurality of indents 46 or one of the bushings at the bottom of the support plate.

Each of the four clamping recesses 72, 74, 76, 78 are configured to receive a clamping piston 106, such as that depicted in FIG. 9. The clamping piston 106 has a substantially well-known design. One clamping piston 106 is seated in each clamping recess. Piston rings (not shown) are employed create seals for the clamping pistons so that air supplied to each clamping recess 72, 74, 76, 78 does not escape by leaking out between the side wall of each recess 72, 74, 76, 78 at the clamping piston 106 positioned in each recess.

The control valve 18 is attached to the side of the base 16 which includes the lift terminator 86, the locate terminator 88, and the clamp terminator 90. The valve 18 is depicted schematically in FIG. 6. The valve has a housing or a valve body 107, a handle 108, a lift supply 110 in fluid communication with the lift terminator 86, a locate supply 112 in fluid communication with the locate terminator 88, and a clamp supply 114 in fluid communication with the clamp terminator 90. Each of the supplies 110, 112, 114 are essentially pathways formed in the control valve 18.

The control valve 18 is preferably formed from a strong durable metal such as steel hard plastic or the like. Other durable materials which are able to withstand pressures of around 200 pounds/square inch may also be used to form the control valve 18. The valve 18 includes an incoming air port 116 and an outgoing air port 117. The incoming air port 116 of the valve 18 is attached to the output of an air compressor (not shown). The outgoing air port 117 is a pathway formed in the control valve 18 which provides a pathway for air to escape from the control valve 18 to the outside. A valve ball 118 is disposed intermediate the incoming air port 116 and each of the supplies 110, 112, and 114. The valve ball 118 is rotatably housed within the valve body 107, and is rotated via the handle 108 which is attached thereto via a screw rivet, welding or other well known means for attaching 109. The valve ball 118 includes an aperture 122 formed therethrough. The aperture 122 is aligned so that when the handle 108 is moved to a first position, the valve ball 118 attached to the handle 108 moves with the handle 108 and is rotationally positioned such that the incoming air port 116 is in fluid communication with the lift supply 110 and the locate supply 112, and the clamp supply 114 are in fluid communication with the outgoing air port 117.

When the handle 108 is moved to a second position, the valve ball 118 attached to the handle 108 moves with the handle 108 and is rotationally positioned such that the incoming air port 116 is in fluid communication with the locate supply 112 and the clamp supply 114 is in fluid communication with the outgoing air port 117. When the handle 108 is moved to a third position, the valve ball 118 attached to the handle 108 moves with the handle 108 and is rotationally positioned such that the clamp supply 114 is in fluid communication with the incoming air port 116 and the locate supply 112 is in fluid communication with the outgoing air port 117.

FIG. 1 depicts the indexing table 10 in use. Essentially, a work piece 20 to be machined is mounted to the mounting plate 12. The control valve 18 is connected to an air compressor at the incoming air port 116 via an air hose 124. Means for connecting an air compressor to a valve are well known in the art. The handle 108 is moved to a first position to lift the support plate 14 and the mounting plate 12. When the handle 108 is in this first position, the air supplied by the compressor flows through the valve ball 118 and exits the valve 18 at the lift supply 110. Because the lift supply 110 and the lift terminator 86 are in fluid communication, the air flows into the lift pathway 80 and thusly into the lift recess 65. The pressurized air actually lifts the support plate 14 and the mounting plate 12 up off of the base 16. The rotate sphere 96, because it is upwardly biased via the die spring 95, allows the plates 12, 14 to be rotated around an axis. A user then rotates the mounting plate 12 until a desired angle of rotation is achieved as indicated by the plurality of markings 40. Whenever the mounting plate 12 is rotated, the support plate 14, which is mounted thereto, rotates as well.

Once the mounting plate 12 is positioned, the user then moves the handle 108 from the first position to the second position. The incoming air port 116 is now in fluid communication with the locate supply 112. There is now no air flow to the lift supply 110. As such the air slowly escapes from the second recess 44 at the bottom of the support plate 14 and the rotate piston 96 is forced downwardly by the weight of the support and mounting plates 12, 14. At the same time, air flows into the base 16 at the locate terminator 88 and then the locate pathway 82. The locate pistons 102 in the bushings housed in the locate recesses are lifted by air pressure as the air supplied by the compressor flows into the locate recesses 64, 66, 68, 70 and their corresponding bushings. Air pressure supplied by a compressor generally ranges between 160 and 220 pounds per/square foot, but may be higher or lower depending upon the use of the indexing table. The pistons are moved upwardly and the tapered top of each locate piston slidably fits into one of the indents 46 or hardened bushings at the bottom surface of the support plate 14, thereby "locating" the mounting plate 12 and support plate 14 at a precise angular position. Even if the mounting plate 12 was not exactly positioned by a user, the locate pistons 64, 66, 68, 70 ensure that the mounting plate 12 is positioned accurately because each piston head slides into either one of the indents formed in the bottom surface of the support plate, or into one of the bushings.

Once the mounting plate 12 is located, the user moves the handle 108 from the second position to the third position. Now there is fluid communication between the incoming air port 116 and the clamping supply 114. The locate supply 112 is now in fluid communication with the outgoing air port 117 allowing the locate pistons 102 to fall back into the bushings in the locate recesses 64, 66, 68, 70. The clamping pistons 106 move upwardly in response to the increased air pressure. Each clamping piston 106 pushes on the bottom of a clamp 107 which is pivotally mounted to the top 60 of the base. Means for pivotally mounting a clamp to a surface includes hinges or other well known mounting means. The clamp 107, in turn pivots and thusly pushes downwardly upon the rim 36 of the support plate 14, essentially locking the support plate 14 in position.

The present invention provides an indexing table that is far superior to currently produced indexing tables. Because no pivot pins are used in the present indexing table, there is no chance that the table may be damaged if the mounting plate is turned or moved laterally while the mounting plate is clamped or when a user is locating the mounting plate 12.

Additionally, the present indexing table provides a substantially simplified means for oration, i.e. a single handle that is essentially mistake proof. The operations of lifting the table, locating the table, and clamping the table are made mutually exclusive through the use of the valve. Therefore, this indexing table is both easier and safer to use than currently produced indexing tables.

While the invention has been illustrated and described in detail in the drawings and the foregoing description, the same to be considered as illustrative and not restrictive in character, it being understood that only the preferred embodiment has been shown and described and that all changes and modifications that come within the spirit of the invention are desired to be protected.

Having thus described the present invention, what is claimed is:

1. A compressed air operated index table comprising:
   (a) a mounting plate;
   (b) a support plate connected to the mounting plate, the support plate having a top surface and a bottom surface;
   (c) means for rotatably suspending the support plate above the base;
   (d) means for locating the support plate at a specific rotational position;
   (e) means for locking the support plate at a specific rotational position;
   (f) a base connected to the support plate opposite the mounting plate, the base providing a housing for the means for rotatably suspending the support plate;
   (g) selective fluid pathways extending between a valve and (1) the means for rotatably suspending, (2) the means for locating, and (3) the means for locking; and
   (h) the valve disposed on the base, the valve selectively and sequentially actuating the means for rotatably suspending, the means for locating, and the means for locking, the valve comprising:
      (1) a valve body having an incoming air port;
      (2) a valve ball rotatably housed in the valve body; and
      (3) a handle connected to the valve ball to rotate the valve ball into any one of a first, a second, and a third rotational position such that when the valve ball is in a first of the rotational positions the handle actuates the means for rotatably suspending, when the valve ball is in a second of the rotational positions the handle actuates the means for locating, and when the valve ball is in a third of the rotational positions the handle acutates the means for locking through the selective fluid pathway.

2. The indexing table of claim 1 wherein the means for locating the support plate at a specific rotational position comprises a plurality of indents disposed in the bottom surface of the support plate.

3. The indexing table of claim 2 wherein the means for rotatively suspending the support plate comprises a lift pathway formed in the base.

4. The indexing table of claim 1 wherein the means for rotatively suspending the support plate comprises a stream of pressurized gas directed at the bottom surface of the support plate.

5. The indexing table of claim 4 wherein the means for rotatively suspending the support plate further comprises a rotate sphere slidably housed in the base.

6. The indexing table of claim 5 wherein the rotate sphere is upwardly biased.

7. The indexing table of claim 6 wherein the rotate piston is upwardly biased via a die spring.

8. The indexing table of claim 1 wherein the means for locating the support plate at a specific rotational position comprises a plurality of indents disposed in the bottom surface of the support plate.

9. The indexing table of claim 8 wherein the means for locating the support plate at a specific location additionally comprises a plurality of markings disposed upon the support plate.

10. The indexing table of claim 1 wherein the means for locking the support plate at a specific rotational position comprises at least one clamp pivotally mounted to the base and configured to selectively engage the support plate.

11. The indexing table of claim 10 wherein the means for locking the support plate further comprises at least one clamping piston slidably housed in the base.

12. The indexing table of claim 1 wherein the value body includes at least one supply formed therein.

13. The indexing table of claim 12 wherein the at least one supply comprises a lift supply, a locate supply, and a clamp supply.

14. The indexing table of claim 13 wherein each of the lift supply, the locate supply, and the clamp supply are in registry with a corresponding lift terminator, a locate terminator, and a clamp terminator.

15. The indexing table of claim 1 wherein the support plate is connected to the mounting plate via bolts.

16. The indexing table of claim 1, wherein:
   (a) the base has a lift pathway formed therein between a lift terminator and the means for rotatably suspending;
   (b) the base has a locate pathway formed therein between a locate terminator and the means for locating;
   (c) the base has a clamping pathway formed therein between a clamping terminator and the means for locking;
   (d) the valve body has a lift supply formed therein between the lift terminator of the base and the valve ball;
   (e) the valve ball has a locate supply formed therein between the locate terminator of the base and the valve ball;
   (f) the valve ball has a clamp supply formed therein between the clamp terminator of the base and the valve ball;
   (g) the valve ball has an aperture formed therein, the aperture in the valve ball in fluid communication with the incoming air port; and
   further wherein when the handle is in the first of the rotational positions, the aperture in the valve ball is in fluid communication with the lift supply, when the handle is in the second of the rotational positions, the aperture in the valve ball is in fluid communication with the locate supply, and when the handle is in the third of the rotational positions the aperture in the valve ball is in fluid communication with the clamp supply, and the lift pathway, the locate pathway, and the clamping pathway cooperate to define the selective fluid pathways.

* * * * *

UNITED STATES PATENT AND TRADEMARK OFFICE
CERTIFICATE OF CORRECTION

Page 1 of 2

PATENT NO. : 5,862,718
DATED : January 26, 1999
INVENTOR(S) : Jeff L. Keisling

It is certified that error appears in the above-identified patent and that said Letters Patent is hereby corrected as shown below:

Column 2, line 40, delete "an" and replace with --a compressed air operated--.

Column 2, line 42, before ";" insert --, the support plate having a top surface and a bottom surface--.

Column 2, line 43, delete "rotatively" insert --rotatably--.

Column 2, line 48, delete "rotatively" insert --rotatably--.

Column 2, line 49, delete "and".

Column 2, delete lines 50-54, and insert
--selective fluid pathways extending between a valve and (1) the means for rotatably suspending, (2) the means for locating, and (3) the means for locking; and the valve disposed on the base, the valve selectively and sequentially actuating the means for rotatably suspending, the means for locating and the means for locking, the valve comprising:

(1) a valve body having an incoming air port;

(2) a valve ball rotatably housed in the valve body; and

UNITED STATES PATENT AND TRADEMARK OFFICE
CERTIFICATE OF CORRECTION

PATENT NO. : 5,862,718
DATED : January 26, 1999
INVENTOR(S) : Jeff L. Keisling

It is certified that error appears in the above-identified patent and that said Letters Patent is hereby corrected as shown below:

(3) a handle connected to the valve ball to rotate the valve ball into any one of a first, a second, and a third rotational position such that when the valve ball is in a first of the rotational positions the handle actuates the means for rotatably suspending, when the valve ball is in a second of the rotational positions the handle actuates the means for locating, and when the valve ball is in a third of the rotational positions the handle actuates the means for locking through the selective fluid pathways.--

Signed and Sealed this

Twenty-third Day of March, 1999

Attest:

Q. TODD DICKINSON

*Attesting Officer*

*Acting Commissioner of Patents and Trademarks*